United States Patent [19]

Carnevale et al.

[11] Patent Number: 4,836,316

[45] Date of Patent: Jun. 6, 1989

[54] BATH SCALE

[75] Inventors: Francesco L. Carnevale, Waynesboro; Kirk D. Morrow, Meridian, both of Miss.

[73] Assignee: Sunbeam Corporation, Downers Grove, Ill.

[21] Appl. No.: 101,619

[22] Filed: Sep. 28, 1987

[51] Int. Cl.$^4$ .................. G01G 21/08; G01G 23/14
[52] U.S. Cl. ................................. 177/256; 177/169
[58] Field of Search .................... 177/256, 168–170

[56] References Cited

U.S. PATENT DOCUMENTS

| | | | |
|---|---|---|---|
| 3,589,460 | 6/1971 | Hanssen | 177/256 |
| 3,759,338 | 9/1973 | Petersen et al. | 177/256 X |
| 4,452,326 | 6/1984 | Hanssen et al. | 177/256 |
| 4,458,771 | 7/1984 | Hanssen et al. | 177/256 |
| 4,643,266 | 2/1987 | Baccini | 177/169 |

Primary Examiner—George H. Miller, Jr.
Attorney, Agent, or Firm—Neil M. Rose

[57] ABSTRACT

A bath scale of the type having a platform supported by force gathering levers carried by a base pan is made of reduced height through the use of a compression load spring and a molded plastic support which mounts the indicator dial, the calibration mechanism and the linkage which interconnects the load spring and the pinion for the indicator dial.

13 Claims, 2 Drawing Sheets 4,836,316

BATH SCALE

FIELD OF THE INVENTION

The present invention relates generally to weighing scales and more particularly to compact, portable scales which are often termed bath scales.

BACKGROUND OF THE INVENTION AND PRIOR ART

The most popular type of scale sold has for many years been the flat, compact and portable bath scale which is both inexpensive and reasonably accurate for measuring variations in ones body weight. The scale typically includes a flat, rectangular base pan over which a load receiving platform is supported. The lower pan includes peripherally disposed upstanding walls while the platform has peripherally disposed downwardly extending walls which surround the walls on the pan to form an enclosure within which the force collecting and indicating mechanism is disposed.

In the typical scale, there are four force collecting levers which are pivoted in the corners of the base pan and which are interconnected to deliver the sum of the forces on the platform to a pate which bears downwardly on a helical load spring supported by the pan. The amount of deflection by the load applying plate is recorded by a mechanism which generally rotates a dial calibrated to indicate the weight applied to the platform.

Such scales must normally include a zero adjustment mechanism associated with the indicator so that the user may adjust the indicator dial to zero before stepping onto the scale. The scales also normally include a factory calibration adjustment which allows the scale to be calibrated to take into account the variations in the load spring which may be used in the scale.

Since there are many more sophisticated bath scales available which utilize strain gauges and digital output to provide more accurate weight indications, the manufacturers of mechanical bath scale have been under severe pressures to reduce prices in a very competitive product area. Accordingly, manufacturers have consistently attempted to simplify the force gathering means, the indicating mechanism and the calibration and zeroing mechanism. There has also been a trend in the industry toward providing thinner and more compact scales, thereby requiring that the internal mechanisms be made more compact.

One example of an early, thin and structurally simple scale is shown in the recently issued Baccini U.S. Pat. No. 4,643,266. Other prior art patents showing the general type of force collecting means, calibration means and zeroing means with which the present invention is concerned are the U.S. Pat. No. 3,759,338 to Petersen et al., and U.S. Pat. No. 3,426,861 to Provi.

BRIEF SUMMARY OF THE INVENTION

The present invention involves a thin bath scale in which the indicator mechanism which measures and indicates the displacement or the compression of the load spring is made primarily of molded plastic parts which are assembled together with a minimum of assembly means and in a simple manner. The indicator mechanism is made up of a molded plastic bracket which secures to the support pan by simple tab connections and includes the support means for a bell crank which responds to depression of the load spring to rotate a pinion gear also supported in bearings formed integrally with the molded bracket. A link interconnecting the bell crank pinion gear is retained in position and guided by walls formed integrally with the bracket. The calibration means for the scale includes an arm on the bell crank member which is adjustable in length by simply threading a screw into and out of the hub of the bell crank.

Accordingly, it is an object of the present invention to provide an improved mechanical bath scale which has a simplified indicator mechanism.

It is a further object of the present invention to provide an improved indicator mechanism for a mechanical bath scale including molded parts which are readily assembled together.

A further object of the present invention is to provide an indicator mechanism for a compact mechanical bath scale including an integrally molded mechanism bracket which supports a plastic pinion gear, dial support and indicator dial, as well as a bell crank and connecting link which drives the indicator dial in response to depression of a load spring.

Further objects and advantages of the instant invention will become obvious to one skilled in the art as the following description proceeds, and the features of novelty which characterize the invention will be pointed out in the claims annexed to and forming a part of the specification.

Figure 1:
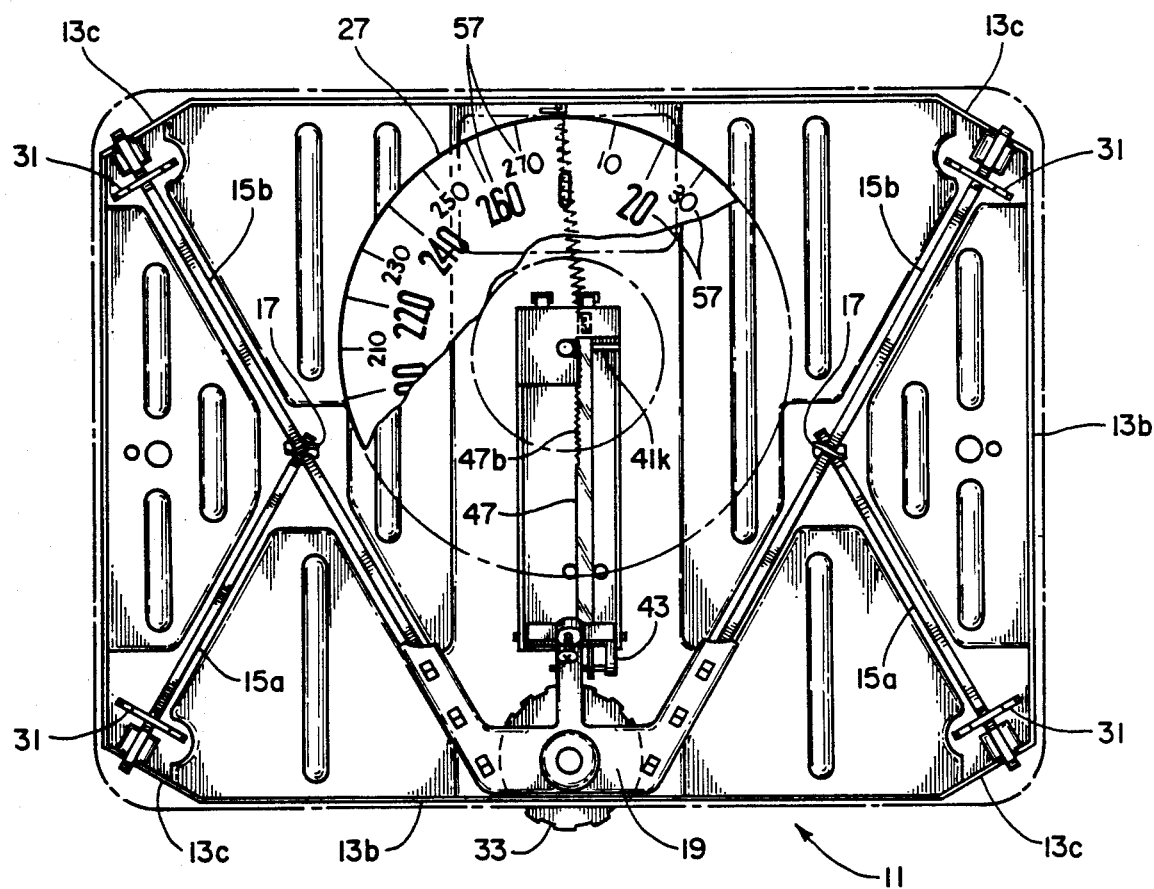
FIG. 1 is a top plan view of a scale embodying my invention with the load receiving platform removed to dispose the internal mechanism and with portions of the indicator dial cut away.
Figure 2:
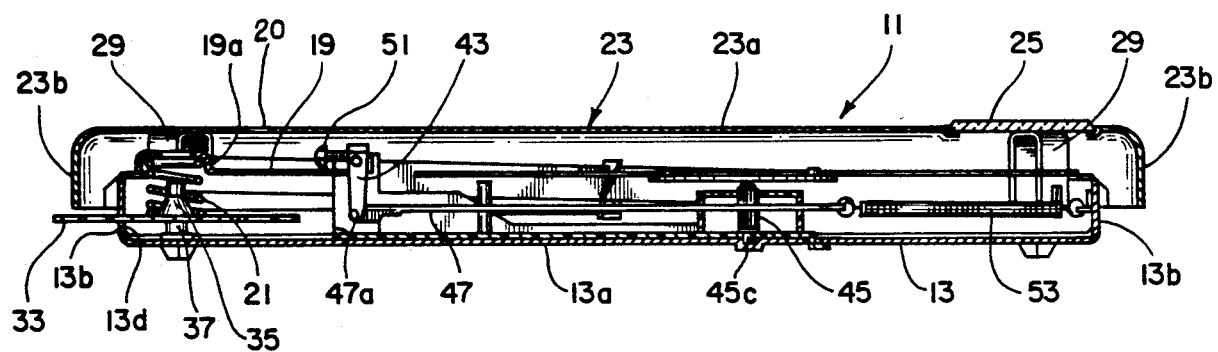
FIG. 2 is a sectional view of the scale of FIG. 1 taken generally along line 2—2 but showing the zero adjustment in full line.

Referring to the drawings, there is shown in FIGS. 1 and 2 a flat, mechanical bath scale indicated generally by reference numeral 11. The scale 11 includes a lower rectangular pan 13 which has a bottom 13a and upstanding side walls 13b which extend upwardly from around the entire periphery of the support pan 13. As may best be noted in FIG. 1, the corners of the pan 13 are provided with angled walls 13c which are angled and formed with notches to support the force gathering levers 15a and 15b.

As is conventional in flat mechanical bath scales, the levers 15a are shorter than the levers 15b and are connected together by links at 17. The adjacent ends of the levers 15b are secured to a plate 19 which bears against the upper end of a load spring 21.

Superimposed over the pan 13 is a load receiving platform 23 which includes a horizontal portion 23a and depending walls 23b which extend downwardly from the edges of the horizontal portion 23a. As may be seen from FIG. 2, the pan 13 and the platform 23 with their overlapping walls 13b and 23b form an enclosure within which the force collecting and indicating mechanism of the scale is received. The platform 23 is formed with an opening in which a transparent lens 25 is mounted to permit visual observation of an indicator dial 27 which is mounted beneath the platform 23 and disposed in a generally horizontal plane.

In order to support the platform 23 on the force collecting levers 15a and 15b, the platform 23 is provided with four inverted U-shaped members 29 shown only incompletely in FIG. 2. The U-shaped members 29 which are welded to the underside of the platform 23 engage W-shaped plates 31 which rest in V-shaped notches in the force collecting levers 15a and 15b adjacent their pivotal mountings with respect to the pan 13, as is best shown in FIG. 1. The structure of the force collecting levers and the manner in which the platform 23 and the pan 13 interact with such levers is entirely conventional and well known in the art.

The load spring 21 is a coil spring which rests at its lower end on a zero adjustment disc 33 which extends through a slot 13d in the side wall of the pan 13 so that the outer periphery of the zero adjustment disc 33 is exposed for manual adjustment, as may be seen in FIGS. 1 and 2. The disc 33 is formed with an internally threaded bushing 35 which is received on a threaded stud 37 mounted in the pan 13 to extend upwardly as shown in FIG. 2. The upper end of the spring 31 is received within a cup-shaped portion 19a formed in the plate 19 to retain the upper end of the spring in proper alignment with the lower end which is retained by the bushing 35. Thus, it may be seen that rotation of the zero adjustment disc 33 causes the spring 21 to move upwardly or downwardly which may thereby zero the indicator dial 27 as will be explained further below.

A load applied to the platform 23 produces forces which are collected by the levers 15a and 15b and which are applied to the plate 19, thereby causing the load spring 21 to be compressed. The degree of compression of the spring is then used as the indication of the weight applied to the platform 23. The conversion of this displacement of the plate 19 into a rotation of the indicator dial 27 is accomplished by means of the indicator mechanism 39 which is shown in exploded perspective in FIG. 3. The indicator mechanism 39 includes a plastic molded indicator mechanism bracket 41, a bell crank 43, a pinion gear 45 and a link 47.

Figure 4:
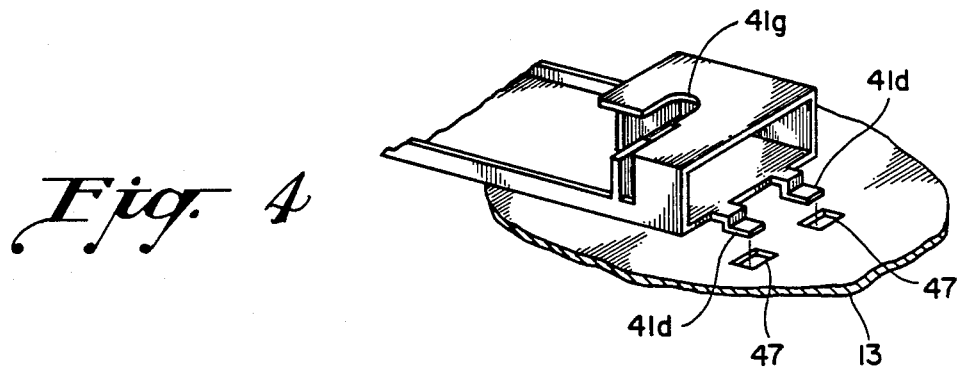
FIG. 4 is a further simplified exploded perspective showing only the indicator mechanism bracket in juxtaposition with the support pan to which it is to be assembled.

Turning first to the bracket 41, it is a one-piece, plastic molded part which includes a base 41a, vertically extending horizontally spaced parallel side walls 41b, and a horizontally disposed bearing support wall 41c. In order to support the base 41a of the bracket 41 with respect to the pan 13, the bracket 41 is provided with tabs 41d best shown in FIG. 4 which extend through openings 47 at the bottom of the pan 13 in FIG. 4 showing the parts in their disassembled position. In the assembled position, the lowermost ends of the tabs 41d would be beneath the bottom face of the pan 13. At the other end of the bracket 41, an opening 41e is provided through which a struck out tab 49 from the bottom wall 13a extends. The tab 49 is bent over to retain the bracket 41 securely with respect to the bottom 13a of the pan 13. To assemble the bracket 41 to the pan 13, the bracket 41 is placed at an angle with respect to the bottom 13a, enabling the tabs 41d to be inserted through the openings 47 at which time the bracket 41 is pivoted downwardly, allowing the tab 49 which is positioned vertically to extend through the opening 41e in the bracket 41. The tab 49 is then struck over to retain the bracket flat against the upper surface of the bottom wall 13a.

The bell crank 43 includes an integrally molded plastic arm 43a which extends from a hub portion 43b. The hub portion 43b has bearing projections 43c extending from either end thereof and a centrally threaded opening 43d which is designed to receive the threaded member 51 having a slotted head 51a. The arm 43a of the crank arm 43 has a bearing projection 43e which extends inwardly parallel to the axis defined by the bearings 43c and spaced therefrom. In order to mount the crank arm 43 with respect to the bracket 41, the walls 41b are sprung outwardly slightly to permit the crank arm to be inserted therebetween with the bearing projections 43c extending into the bearing holes 41f. The openings 41f are coaxial and serve as journal bearings for the projections 43c to mount the crank arm 43 for pivotal movement with respect to the bracket 41.

Figure 3:
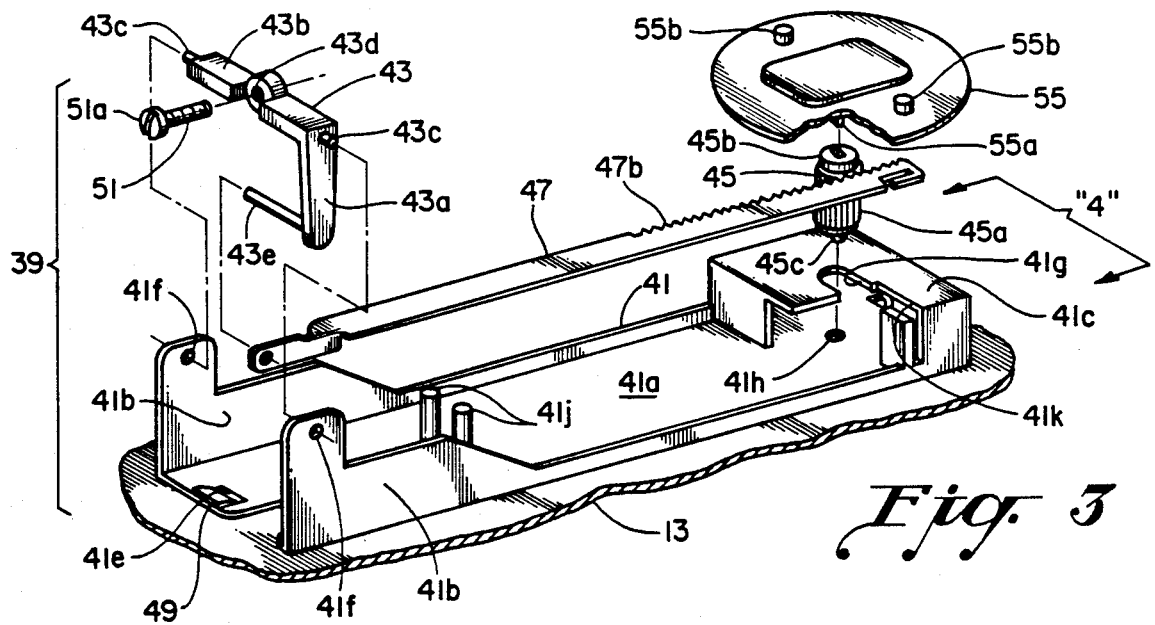
FIG. 3 is an exploded perspective view of the indicator mechanism.

At the other end of the bracket 41 the wall 41c is provided with a semi-circular recess or slot 41g as is shown in FIGS. 3 and 4. Aligned with the recess 41g is an opening 41h formed in the base 41a of the bracket 41. The pinion 45 is formed with gear teeth 45a above which there is an annular shoulder 45b which is of suitable diameter to be journaled in the recess 41g. The lower end of the pinion gear 41 is formed with a protuberance 45c which is journaled in the hole 41h in the bracket 41.

Figure 5:
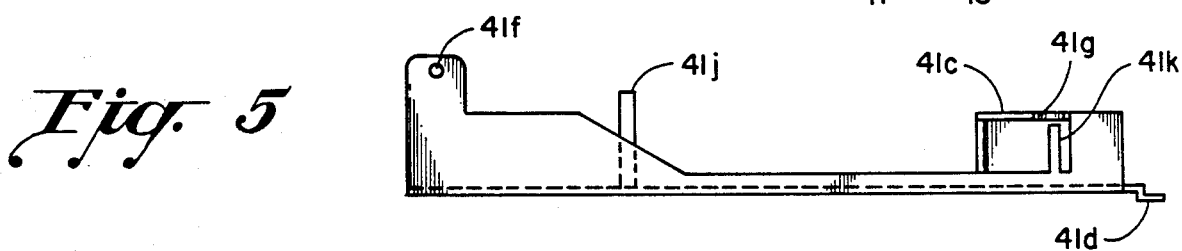
FIG. 5 is a side elevational view of the indicator mechanism bracket.
Figure 6:
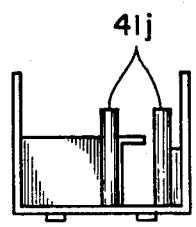
FIG. 6 is a left end elevational view of the indicator mechanism bracket of FIG. 5.
Figure 6:
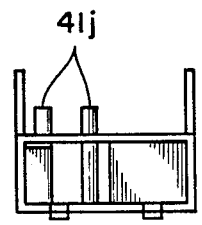
Figure 6:
Figure 7:
FIG. 7 is a right end elevational view of the indicator mechanism bracket of FIG. 5.

For the purpose of retaining the link 47 interengaged with the crank arm 43 and the pinion 45, there are provided various guide walls or projections on the bracket 41 molded integrally therewith. Adjacent to the crank arm 43 there are a pair of vertical posts 41j as best shown in FIGS. 3, 5 and 6. The link 47 is provided with an opening which is received on the pin 43e of the crank arm 43 while the link 47 extends between the two posts 41j. This prevents the link 47 from being displaced laterally in such a manner that the pin 43e might be disengaged from the hole 47a in the link 47.

The other end of the link 47 is formed with a gear rack 47b which engages the pinion gear 45, and more specifically, the gear teeth 45a thereon. As so positioned with the gear rack 47b engaged with the pinion 45, a wall 41k engages the side of the link 47 away from the gear rack 47b, thereby maintaining the link 47 in engagement with the pinion gear 45 and retaining the pinion gear within the open recess 41g. From the foregoing, it is obvious that the various parts associated with the indicator mechanism 39, including the crank arm 43, the link 47 and the gear 45, are merely fitted together and inserted in place and require no independent assembly means. Also associated with the indicator mechanism 37 is a tension spring 53. One end of the tension spring 53 is secured to the pan wall 13b as shown in FIG. 2 and the other end is secured to the link 47. The lengthwise force on the link 47 causes the crank arm 43 to be rotated in a counterclockwise direction as viewed in FIG. 2 so that the threaded member or arm 51 is engaged with the plate 19. Thus, any movement of the plate 19 as the load spring 21 is compressed with be reflected in a rotation of the crank arm 43 lengthwise movement of the movement of the link 47 and rotation of the pinion gear 45.

After the scale 11 is completely assembled, except for the decorative pad which would be secured to the top of platform 23, the scale is calibrated through the adjustment of threaded member 51 while subjecting the scale to a known load. An opening 20 in the platform 23 permits a screw driver to be inserted into engagement with the head 51a for accomplishing the factory calibration of the scale.

Secured to the upper end of the pinion gear 45 is an indicator dial support 55 which has a downwardly extending projection 55a which fits into a corresponding opening in the top of the pinion gear 45 to secure the indicator dial support so that it is positioned in a generally horizontal plane and normal to the axis of rotation of the gear 45. The indicator dial support 55 is also formed with a series of projections 55b which correspond to openings in the indicator dial 27 and assure that the indicator dial may be assembled to the dial support 55 in only one orientation so that indicia 57 appearing on the dial 27 will be properly oriented.

In reducing the cost of the type of bath scale with which the invention is concerned, we have substituted molded plastic parts wherever metal was not required for its strength and wear characteristics. By simplifying the indicator mechanism and fabricating it largely of molded plastic parts, we have reduced the cost of the parts and the cost of assembly. The design has also made it possible to reduce the thickness of the scale.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A thin bath scale comprising a rectangular support pan having four sides with upstanding walls along each side, a movable load platform substantially coextensive with and spaced above said pan, a load spring having a lower end supported in said pan, force collecting levers supported by said upstanding walls and engaged by said platform, said levers being connected to a spring biasing plate which engages an upper end of said load spring to compress said load spring in proportion to the load applied to said platform, a deflection sensing mechanism including an elongated molded plastic bracket secured to said pan and having a dial support at one end and a bell crank support at the other end, a pinion gear supported for rotation about a vertical axis in spaced upper and lower bearings formed in said plastic bracket, an indicator dial mounted on said pinion gear under said platform and visible through an opening in said platform, a bell crank journaled for rotation about a horizontal axis in horizontally spaced bearings formed integrally with said other end of said plastic bracket, an elongated rack member connected to a first arm of said bell crank at one end and having a gear rack engaged with said pinion at the other end whereby rotation of said bell crank rotates said indicator dial, a second arm on said bell crank engaging said biasing plate to cause said dial to respond to deflections of said load spring.

2. The bath scale of claim 1 wherein said second arm of said bell crank is variable in length to change the amount said dial will rotate to respond to a predetermined deflection of said load spring.

3. The bath scale of claim 2 wherein said bell crank comprises a molded plastic portion including a hub and support bearings and said first arm which is pivotally connected to one end of said rack member, said second arm being a bolt which is threadedly engaged with said hub and which has a head engaged with said biasing plate.

4. The bath scale of claim 1 wherein said plastic bracket includes integrally formed guide walls which engage and guide said rack member for lengthwise movement in a horizontal plane, the one of said guide walls being adjacent said pinion and cooperating with said pinion to guide said gear rack for movement in engagement with said pinion to rotate said pinion when said rack member moves lengthwise.

5. The bath scale of claim 4 wherein a tension spring is connected to said other end of said rack member and to said upstanding walls of said pan to bias said second arm of said bell crank into engagement with said biasing plate.

6. The bath scale of claim 1 wherein said load spring is supported at its lower end by a zero adjustment disc, said disc being supported by said pan for rotation about a vertical axis, said disc extending through a slot in said upstanding wall for manual rotation of said disc, the support of said disc with respect to said pan including a threaded connection which causes said disc to move vertically as rotated to move said load spring up or down to zero said dial.

7. An indicator mechanism for a bath scale comprising an elongated molded plastic mechanism bracket having a dial support at a first end and a bell crank support at the other end, said bracket having a flat base with means to secure said bracket to the metallic support pan of a scale, said bell crank support comprising a pair of spaced parallel walls extending vertically from said other end of said bracket and having spaced coaxial openings formed in said walls, a bell crank having first and second arms extending radially from a hub portion, said hub portion having coaxial bearing projections which are received in said spaced openings, an elongated pinion gear supported by said bracket, said dial support including a bearing wall formed integrally with said bracket and being spaced above and parallel to said base, said bearing wall having a semicircular recess along one edge which is a partial bearing for an upper end of said elongated pinion gear which is supported for rotation about a vertical axis, said pinion gear having a lower end formed with a bearing projection received in an opening in said base, an elongated link drivingly connecting said bell crank and said pinion gear, said link being pivotally articulated with one of said bell crank arms at one end and having a gear rack engaged with said pinion at its other end.

8. The indicator mechanism of claim 7 wherein said bracket is formed with integrally molded guide walls which engage said link and guide said link for lengthwise movement in a horizontal plane, at least one of aid guide walls being adjacent said end of said link connected to said bell crank and at least one of said guide walls being spaced adjacent to said pinion gear, said end of said link having said gear rack being held against said pinion gear by one of aid guide walls.

9. The indicator mechanism of claim 8 wherein the end of said link having said gear rack is restricted from vertical displacement by the engagement with the underside of said bearing wall and by a guide wall extending upwardly from said base beneath said link.

10. The indicator mechanism of claim 7 wherein said bell crank is formed by an integrally molded part including said hub portion and one of said arms, the second of said arms extends radially of said hub portion and is threadedly engaged therewith to vary the length of said second arm.

11. The indicator mechanism of claim 10 wherein said integrally molded bell crank arm includes a link connecting pin which extends in spaced parallel relation to said hub portion and to the axis of rotation of said bell crank, said link having an aperture in the end opposite from said gear rack to receive said connecting pin to pivotally articulate said bell crank and said link.

12. The indicator mechanism of claim 11 wherein said guide walls adjacent to said bell crank prevent horizontal lateral displacement of the end of said link opposite from said gear rack and prevent disengagement of said link from said pin.

13. The indicator mechanism of claim 7 including an indicator dial support on the upper end of said pinion gear, an indicia bearing dial carried by said support, said dial support comprising a disc positioned in a plane normal to the axis of said pinion gear and having projections on the upper face thereof which cooperate with openings in said dial to prevent assembly to said disc to said dial support in any one but the desired orientation.

* * * * *